(12) United States Patent
Cifarelli et al.

(10) Patent No.: US 10,341,369 B2
(45) Date of Patent: Jul. 2, 2019

(54) SECURITY SYSTEM MONITORING TECHNIQUES BY MAPPING RECEIVED SECURITY SCORE WITH NEWLY IDENTIFIED SECURITY SCORE

(71) Applicant: NCR Corporation, Duluth, GA (US)

(72) Inventors: Claudio Cifarelli, Rome (IT); Massimo Mastropietro, Rome (IT)

(73) Assignee: NCR Corporation, Atlanta, GA (US)

( * ) Notice: Subject to any disclaimer, the term of this patent is extended or adjusted under 35 U.S.C. 154(b) by 70 days.

(21) Appl. No.: 15/083,691

(22) Filed: Mar. 29, 2016

(65) Prior Publication Data
US 2017/0289182 A1 Oct. 5, 2017

(51) Int. Cl.
| | |
|---|---|
| G06F 21/31 | (2013.01) |
| H04L 29/06 | (2006.01) |
| G06F 16/2457 | (2019.01) |
| G06Q 40/02 | (2012.01) |
| G06Q 20/10 | (2012.01) |
| G06Q 20/40 | (2012.01) |
| G06F 21/62 | (2013.01) |

(52) U.S. Cl.
CPC .... *H04L 63/1425* (2013.01); *G06F 16/24578* (2019.01); *G06Q 20/1085* (2013.01); *G06Q 20/4016* (2013.01); *G06Q 40/02* (2013.01); *H04L 63/20* (2013.01)

(58) Field of Classification Search
CPC ....... H04L 43/1425; G06F 21/31; G06F 21/62
USPC ........................................................... 726/1
See application file for complete search history.

(56) References Cited

U.S. PATENT DOCUMENTS

| | | | | |
|---|---|---|---|---|
| 7,908,645 | B2 | 3/2011 | Varghese et al. | |
| 9,516,053 | B1 * | 12/2016 | Muddu | H04L 63/1425 |
| | | | | 726/25 |
| 9,569,797 | B1 * | 2/2017 | Rohn | G06Q 40/025 |
| | | | | 726/25 |
| 9,601,000 | B1 * | 3/2017 | Gruss | G06F 21/31 |
| | | | | 726/25 |
| 9,798,883 | B1 * | 10/2017 | Gil | G06F 21/577 |
| | | | | 726/25 |
| 9,843,596 | B1 * | 12/2017 | Averbuch | H04L 63/1416 |
| | | | | 726/25 |
| 2009/0172021 | A1 * | 7/2009 | Kane | G06F 17/30873 |
| | | | | 726/25 |

(Continued)

FOREIGN PATENT DOCUMENTS

| | | |
|---|---|---|
| WO | 2013/082190 A1 | 6/2013 |
| WO | 2014/160296 A1 | 10/2014 |

OTHER PUBLICATIONS

European Search Report dated Jun. 19, 2017 issued in co-pending European Patent Application 17161711.1.
EP Examination Report—dated May 15, 2018.

*Primary Examiner* — Haresh N Patel
(74) *Attorney, Agent, or Firm* — Schwegman, Lundberg & Woessner (57) ABSTRACT

Security rules of a security system include original security scores as conditions for raising alerts. The original security scores are dependent on the underlying scoring mechanism of the security system. When the scoring mechanism is updated to produce new security scores, the security rules are updated ensuring that the alert rates associated with the original security scores match the alert rates associated with the new security scores, which replace the original security scores in the security rules.

20 Claims, 6 Drawing Sheets

(56) References Cited

U.S. PATENT DOCUMENTS

| | | | |
|---|---|---|---|
| 2009/0276257 A1* | 11/2009 | Draper | B25J 9/042 |
| | | | 705/7.28 |
| 2010/0223099 A1* | 9/2010 | Johnson | G06Q 10/04 |
| | | | 705/7.28 |
| 2010/0275263 A1* | 10/2010 | Bennett | G06F 21/577 |
| | | | 726/25 |
| 2012/0158541 A1* | 6/2012 | Ganti | G06Q 30/0185 |
| | | | 705/26.35 |
| 2013/0173514 A1* | 7/2013 | Cruickshank, III | G06N 3/08 |
| | | | 706/20 |
| 2013/0268632 A1* | 10/2013 | Baron | H04L 67/02 |
| | | | 709/219 |
| 2014/0173738 A1* | 6/2014 | Condry | G06F 21/577 |
| | | | 726/25 |
| 2014/0379617 A1* | 12/2014 | Yang | G06Q 30/0631 |
| | | | 706/12 |
| 2015/0095212 A1* | 4/2015 | Openlander | G06Q 40/025 |
| | | | 705/38 |
| 2015/0161394 A1* | 6/2015 | Ferragut | G06F 21/577 |
| | | | 726/25 |
| 2016/0142486 A1* | 5/2016 | Fang | H04L 67/1097 |
| | | | 709/224 |
| 2016/0294858 A1* | 10/2016 | Woolward | G06F 21/552 |
| | | | 726/25 |
| 2016/0344738 A1* | 11/2016 | Dotan | H04L 63/101 |
| | | | 726/25 |
| 2017/0244740 A1* | 8/2017 | Mahabir | H04L 63/1433 |
| | | | 726/25 |

* cited by examiner

SECURITY SYSTEM MONITORING TECHNIQUES BY MAPPING RECEIVED SECURITY SCORE WITH NEWLY IDENTIFIED SECURITY SCORE

BACKGROUND

Security risks that financial institutions are exposed to are constantly evolving and changing. Online network connectivity combined with the perseverance and ingenuity of criminals ensure that financial institutions have to invest heavily in risk management systems for timely responding to potential fraud. Moreover, governments impose significant compliance regulations, such that even if a financial institution wanted to attempt to forego some security to reduce expenditures, compliance strictures ensure that reducing the investment in risk management is a challenging task.

Of course risk management is also more than just fraud detection and prevention, risk management also includes ensuring credit is not extended to a debtor deemed to be too risky to the financial institution or too risky according to compliance regulations.

Typically, a risk management system includes a scoring mechanism where a variety of factors are evaluated to produce scores. The factors and weighting mechanisms of those factors are regularly updated to improve the scores for purposes of accounting for new situations (new data points) or for purposes of accounting for better knowledge by an institution about known situations.

Risk management analysts develop rules relying on the scores produced by their underlying risk management system. These rules are used for determining, in real time, whether any given transaction should: proceed as requested, be flagged for manual inspection, or be denied.

Each rule can potentially raise one or more alerts for each transaction. A large financial institution can have thousands of transactions per minute. The alert rate for each rule is monitored closely by a financial institution because it should remain stable when the underlying scoring mechanism changes within the risk management system. That is, any given existing rule relies on a score (or score range) produced by the at-the-time existing scoring mechanism as a condition for whether or not to raise an alert within the risk management system. If the scoring mechanism changes to a different set of scores or range of scores, the existing rule condition should remain unchanged if the condition having the old score is properly updated to include the new equivalent score from the new scoring mechanism.

So, when a new scoring mechanism is deployed within a risk management system, a significant manual effort is undertaking to update each of the existing rules based on the new scoring values. If this is not done, then the alert rates will dramatically change and resources will be immediately diverted to discover what is occurring within the risk management system.

SUMMARY

In various embodiments, methods and a system for security system monitoring are presented.

According to an embodiment, a method for security system monitoring is presented. Specifically, a security score is received along with an alert rate for the security score. Next, a new security score is identified by matching the alert rate with the new security score. Finally, the security score is mapped to the new security score.

DETAILED DESCRIPTION

Figure 1A:
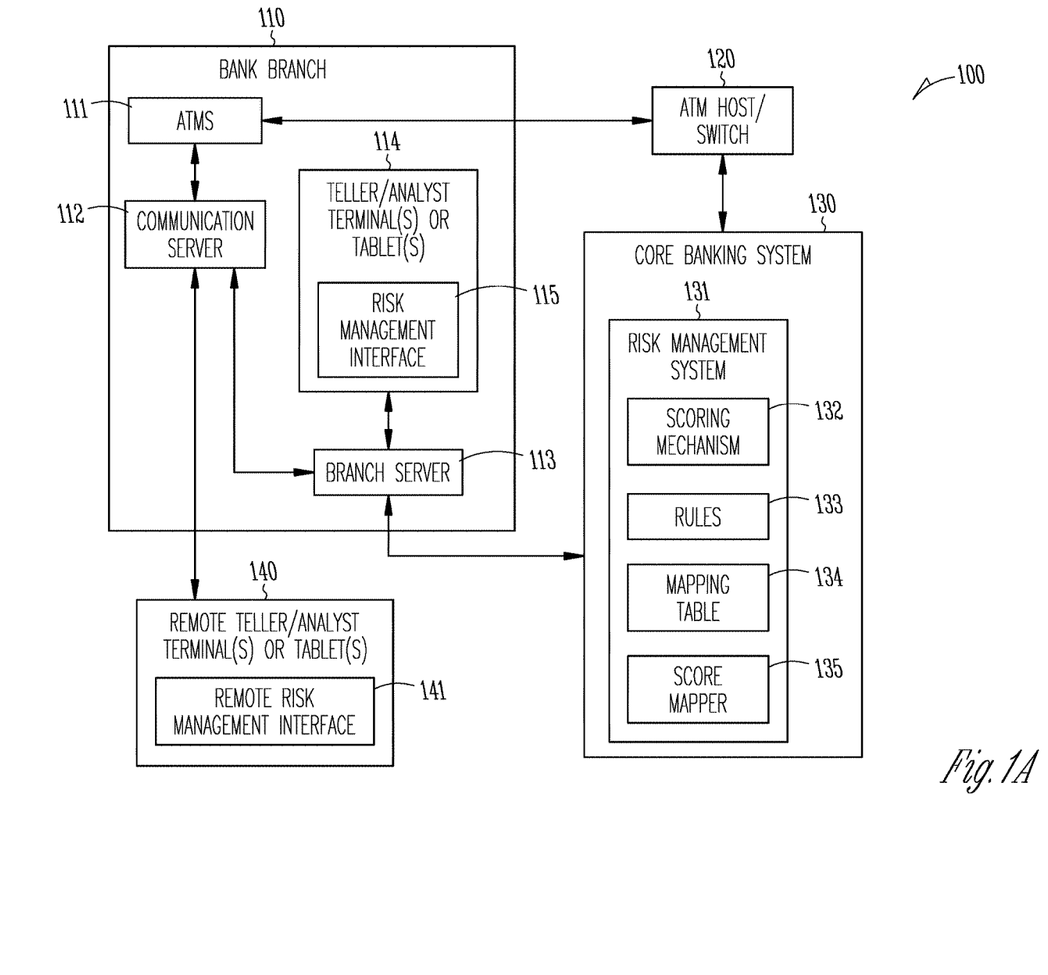
FIG. 1A is a diagram of a banking retail system providing security system monitoring, according to an example embodiment.

FIG. 1A is a diagram of a banking retail system 100 providing security system monitoring, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of security system monitoring, presented herein and below.

The banking retail system 100 includes a bank branch 110, an ATM host/switch 120, a core banking system 130, and one or more remote teller/analyst terminals or tablets 140 (each having a remote risk management interface 141). The bank branch 110 includes ATMs 111, a communication server 112, a branch server 113, and one or more teller/analyst terminals or tablets 114 (each having a risk management interface 115). The core banking system 130 includes a risk management system 131, a score mechanism 132, rules 133, a mapping table 134, and a score mapper 135.

The ATMs 111 conduct financial transactions through the ATMs' host/switch 120 and can request assistance (or have transactions monitored) through the branch server 113 (via the communication server 112).

Remote assistance is available to customers at the ATMs 111 over a network connection between the communication server 112 and the remote teller/analyst terminals or tablets 140.

All financial transactions (electronic from the ATMs 111, remote teller/analyst terminals or tablets 140, or the teller/analyst terminals or tables 140) generate metrics captured and reported to the risk management system 131 of the core banking system 130 in real time.

The metrics are used to generate scores from a scoring mechanism 132. These scores are evaluated in real time by rules 133 (having conditions that include the scores). When the conditions within the rules 133 evaluated to true, alerts are raised within the risk management system 111 that trigger automated actions, reports, and/or notifications.

For example, consider the following rule 133:
IF AMOUNT>1000 AND RISK SCORE>90 THEN DECLINE TRANSACTION The rule 133 relies on the scoring mechanism's score, such that when the scoring mechanism 132 is updated with a new scoring mechanism, the rule 133 may not properly evaluate to true for purposes of declining a transaction that needs to be declined.

When a rule 133 evaluates to true an alert is raised. The alert rates (total number of alerts per rule divided by the total number of transactions) should remain constant when a new scoring mechanism is deployed for an existing rule 133. That is, if a score of 91 (in the present rule example) produced by a pre-updated scoring mechanism 132 generated an alert rate of 0.05%, then a new score of 150 for updated scoring mechanism 132 that produces an alert rate of 0.05% for the rule 133 needs to replace the score of 91 (150 needs to replace 91) in the example rule 133.

The alert rate is often expressed in terms of basis points. A basis point is 1 divided by 10,000. So, an alert rate of 0.05% is expressed as 5 basis points (0.05%=0.0005 (0.05 divided by 100) times 10,000=5).

Figure 1B:
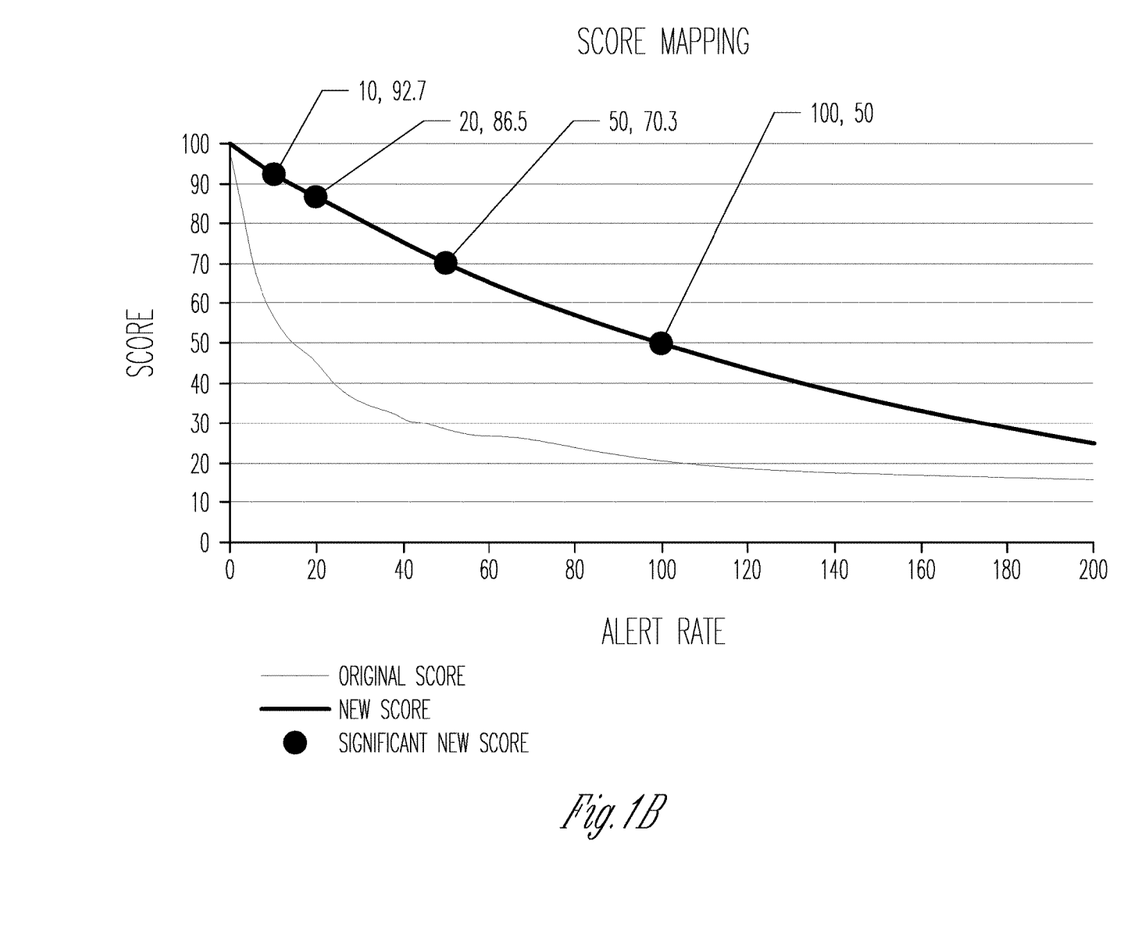
FIG. 1B is an example graph depicting risk management score mapping for an example scenario, according to an example embodiment.

FIG. 1B is an example graph depicting risk management score mapping for an example scenario, according to an example embodiment.

The graph depicts the relationship between scores (ranging from 0 to 100) and alert rates (expressed as basis points and ranging from 0 to 200). An updated scoring mechanism's new scores and alert rates are depicted in the graph as the black and more linear line in the graph. The original score mechanism's scores and alert rates are depicted in the graph as the greyer more quadratic line in the graph. Comparison between the two lines permits the original scores from the original scoring mechanism 132 to be mapped to new scores for the new scoring mechanism 132 to ensure that each original score include a new score mapping to produce the same alert rates (may also be referred herein as alert basis points (BP)) that a given rule 133 produced before the new scoring mechanism 132 was introduced into the risk management system 131. Some of these alert rates and new scores are identified as points in the graph (as significant new scores):

| BP | Score |
|---|---|
| 10 | 92.7 |
| 20 | 86.5 |
| 50 | 70.3 |
| 100 | 50 |

The score mapper 135 is a software module implemented as executable instructions that reside in memory or a non-transitory computer-readable media and those instructions are executed by one or more hardware processors of the core banking server(s) (which also execute the core banking system 130 and the risk management system 131).

The score mapper 135 performs the comparison between any new/updated scoring mechanism 132 and the original scoring mechanism 132 to map original scores embedded in rules 133 to new scores for purposes of ensuring that the rules 133 produce stable and constant alert rates within the risk management system 132 during a transaction to the new/updated scoring mechanism 132 from the original scoring mechanism 132.

Conventionally, when transition to new scores produced from a new/updated scoring mechanism, each rule 133 within the risk management system 131 needs to be manually updated to change the original scores to the new scores. As stated before, this is a significant manual and time consuming processing on the part of a financial institution.

The score mapper 135 maintains a mapping table 134 during execution that includes the original scores for a given rule 133 and each of those score's expected alert rates along with new scores for the original scores that generate the same expected alert rates. For example, the a single score entry in the mapping table 134 managed by the score mapper 135 may appear as follows:

| Original Score | Alert Rate (BP) | New Score |
|---|---|---|
| 21.9 | 91 | 53.1 |

During operation, the score mapper 135 executes in real time, utilizing (initially) two tables. The first table maintains a linkage (mapping) between all original scores used in the rules 133 along with each original score's expected alert rate. The second table maintains all the new scores (produced by the updated scoring mechanism 132) along with each new score's produced alert rate. As rules 133 are selected for evaluation within the risk management system 131, the rules 133 are updated with the new mapped scores by matching the alert rates for the original scores embedded in the rules from the first table with the corresponding new scores that produce the same alert rates as identified in the second table. After some configurable period of time (or once all rules have been updated), the first table and the mapping table 134 are no longer needed because all the mappings for the original scores to the new scores are present in the rules 133. At this point, the second table can be used as a first table along with a new mapping table 134 when the scoring mechanism 132 is changed or updated a second time. So, the process is self-sustaining as new scoring mechanisms 132 are introduced to the risk management system 131 without the need to manual identify and change all the rules 133 each time the scoring mechanism 132 is updated.

This is an entirely automated process performed by the score mapper 135 that does not require any manual intervention. The alert rates are resolved for the new scores of a new scoring mechanism 132 after a configurable period of time when the new scoring mechanism 132 is running in a non-production environment in parallel with the original scoring mechanism 132, such that once all original scores embedded in the rules 133 have been encountered and the alert rates for the new scoring mechanism 132 are known, the new scoring mechanism 132 can be updated to the production environment to replace the original scoring mechanism 132. At this point the mapping table 134 is fully resolved as well to permit the score mapper 135 to dynamically and in real time update the rules as they are called for evaluation.

Figure 1C:
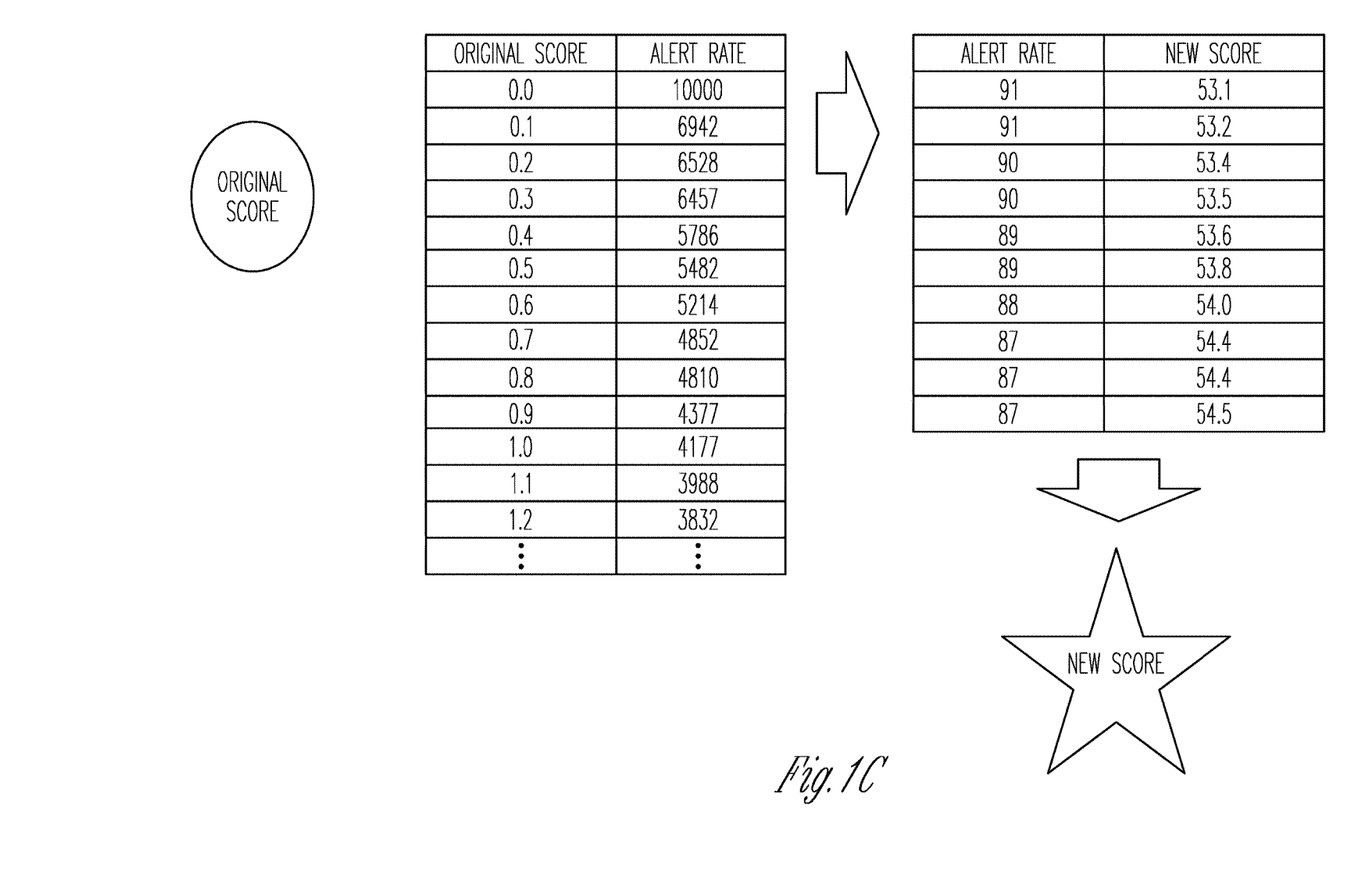
FIG. 1C is an example diagram depicting real-time original score mapping to an alert-rate based new score, according to an example embodiment.

FIG. 1C is an example diagram depicting real-time original score mapping to an alert-rate based new score, according to an example embodiment.

The diagram of the FIG. 1C shows an original mapping between original scores from the rules 133 and their alert rates to a new score for a new/updated scoring mechanism 132 utilizing the mapping produced from the new/updated scoring mechanism 132 with its alert rates and corresponding new scores. The new score is produced by matching the original score found in a given rule 133 to the corresponding alert rate and then searching on that alert rate to find the new score in the alert rates and new score mappings produced from the new/updated scoring mechanism 132.

In an embodiment, the mapping tables 134 and original mappings for current scoring mechanisms 132 are maintained for audit, compliance, history, and problem resolution and can be time stamped and/or version stamped.

It is noted that tellers/analysts have access to the risk management system 131 through the risk management interfaces 115 and 141. With proper authorization (credentials) the interfaces 115 and 141 may be used to create/modify/delete rules, receive alert notifications, and/or generate or receive reports produced by the risk management system 131.

In an embodiment, the risk management interfaces 115 and 141 are web-based browser interfaces to the risk management system 131.

One now appreciates how new scoring mechanisms 132 (replaced scoring mechanisms 132 or updated scoring mechanisms 132) can be introduced into a production (live) environment within a risk management system 131 of a financial institution without having to worry about rules 133 being manually updated to ensure that the alert rates remain constant and stable during the transition. Moreover, this process is self-sustaining for each iteration of a change to the scoring mechanism 132. This can be achieved through the real-time processing of the score mapper 135 (as described above) within the risk management system 131. This provides a substantial improvement and more timely transition than what has heretofore been available in the industry.

Some of the embodiments discussed above and other embodiments are now discussed with reference to the FIGS. 2-4.

Figure 2:
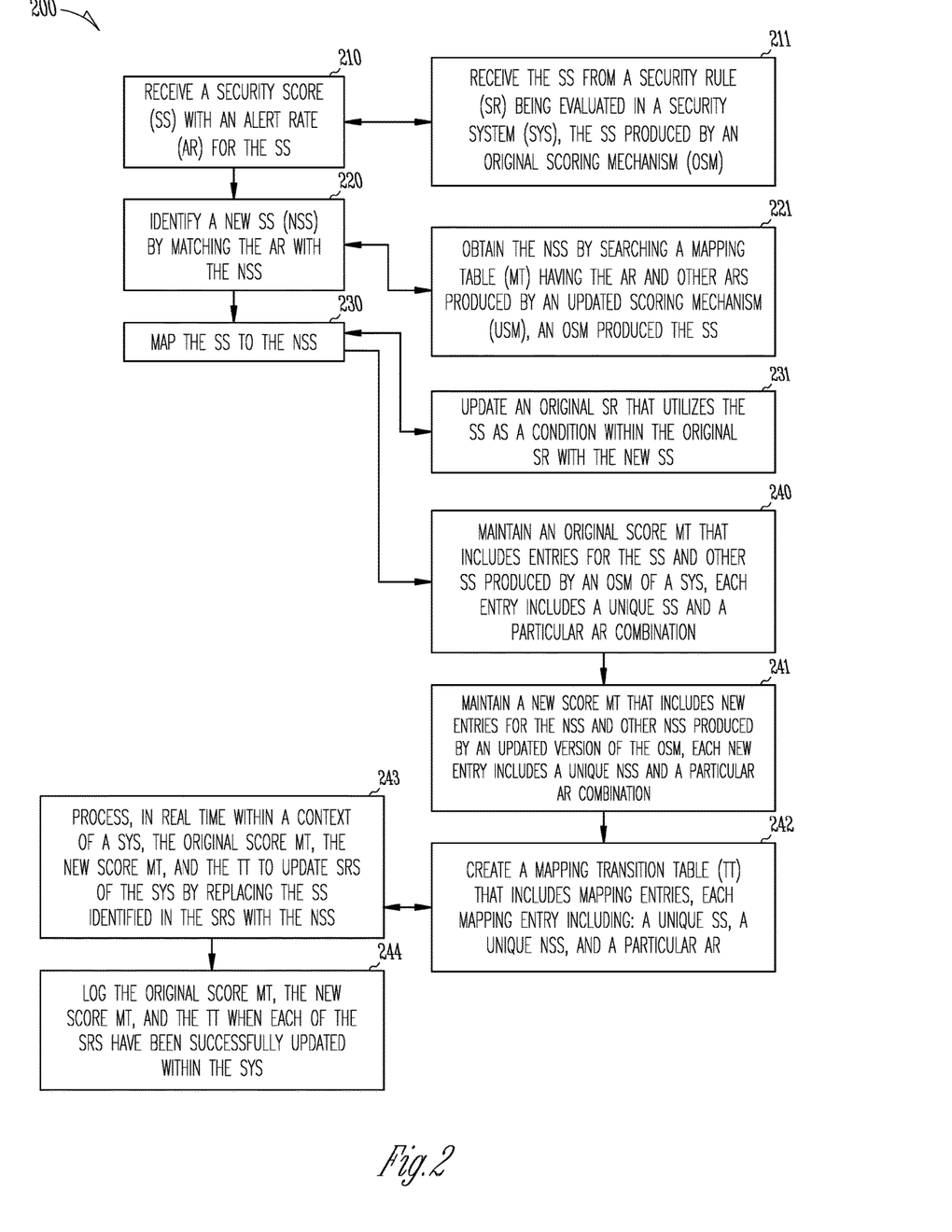
FIG. 2 is a diagram of a method for providing security system monitoring, according to an example embodiment.

FIG. 2 is a diagram of a method 200 for providing security system monitoring, according to an example embodiment. The software module(s) that implements the method 200 is referred to as a "score mapping manager." The score mapping manager is implemented as executable instructions programmed and residing within memory and/or a non-transitory computer-readable (processor-readable) storage medium and executed by one or more processors of a device. The processor(s) of the device that executes the score mapping manager are specifically configured and programmed to process the score mapping manager. The score mapping manager has access to one or more network connections during its processing. The network connections can be wired, wireless, or a combination of wired and wireless.

In an embodiment, the device that executes the score mapping manager is a server.

In an embodiment, the score mapping manager executes on the device within a processing context of the risk management system 131 of the FIG. 1A.

In an embodiment, the score mapping manager is the score mapper 135 of the FIG. 1A.

At 210, the score mapping manager receives a security score along with an alert rate for the security store. The alert rate is equal to the total number of alerts raised by a security rule associated with the security score divided by a total number of transactions processed by a security system that includes the security rule.

According to an embodiment, at 211, the score mapping manager receives the security score from a security rule being evaluated in a security system. The security rule is produced by an original scoring mechanism of the security system that evaluates and weights factors to produce a range of security scores that are evaluated within the security rule. The security score is identified as part of a condition defined within the security rule.

At 220, the score mapping manager identifies a new security score by matching the alert rate with the new security score. That is, and as described in detail above, the alert rate for a new security score produced by a new scoring mechanism (updated or changed original scoring mechanism) of a security system should remain constant when the security rule having the original security score is updated with the new security score. To ensure that this is the case, the distribution of new scores associated with the new scoring mechanism and each new score includes an alert rate. The alert rate for the original security score (identified as just security score in 210) can be used to search this distribution to find a matching alert rate associated with the new scoring mechanism and obtain the new score that is linked to the matching alert rate.

Thus, in an embodiment, at 221, the score mapping manager obtains the new security score by searching a mapping table having the alert rate and other alert rates produced by an updated scoring mechanism for the security system. An original scoring mechanism produces the original security score (again identified as just security score in 210 above).

At 230, the score mapping manager maps the original security score to the new security score based on the matching alert rate, which is the same for the original scoring mechanism that produced the original security score and the new or updated original scoring mechanism that produced the new security score.

According to an embodiment, at 231, the score mapping manager updates an original security rule (which utilizes the original security score as a condition (or portion of a condition) within the original security rule) with the new security score produced by a new or updated version of the original scoring mechanism for the security system.

In an embodiment, at 240, the score mapping manager maintains an original score mapping table that includes entries for the original security scores and other security scores produced by an original scoring mechanism of a security system. Each entry in the original score mapping table includes a unique security score and a particular alert rate combination. Essentially, the distribution of the original score ranges for the original scoring mechanism and each original score's corresponding alert rate are maintained in the original score mapping table.

Continuing with the embodiment of 240 and at 241, the score mapping manager maintains a new score mapping table for the new security score and other security scores produced by an updated version of the original scoring mechanism. Each entry in the new score mapping table includes a unique new security score and a particular alert rate combination. So, the distribution of the new score ranges for the updated original scoring mechanism and each new score's corresponding alert rate are maintained in the new score mapping table.

Continuing with the embodiment of 241 and at 242, the score mapping manager creates a mapping transition table that includes mapping entries. Each mapping entry of the mapping transition table includes a unique original security score, a unique new security score, and a single particular alert rate.

Still continuing with the embodiment of 242 and at 243, the score mapping manager processes, in real time and within a context of a security system, the original security score mapping table, the new score mapping table, and the mapping transition table to update the security rules of the security system by replacing original security scores identified in the security rules with the corresponding new security scores (ensuring that reach replacement maintains a same alert rate for both the original security score that is being replaced and the new security score that is being updated to the security rule being processed).

Continuing with the embodiment of 243 and at 244, the score mapping manager logs the original score mapping table, the new score mapping table, and the mapping transition table when each or all of the security rules have been successfully updated within the security system.

In an embodiment, the security system is any security system that utilizes a scoring mechanism to produce security risk scores where those scores are embedded as conditions (or portions of conditions) within security rules to raise alerts.

Figure 3:
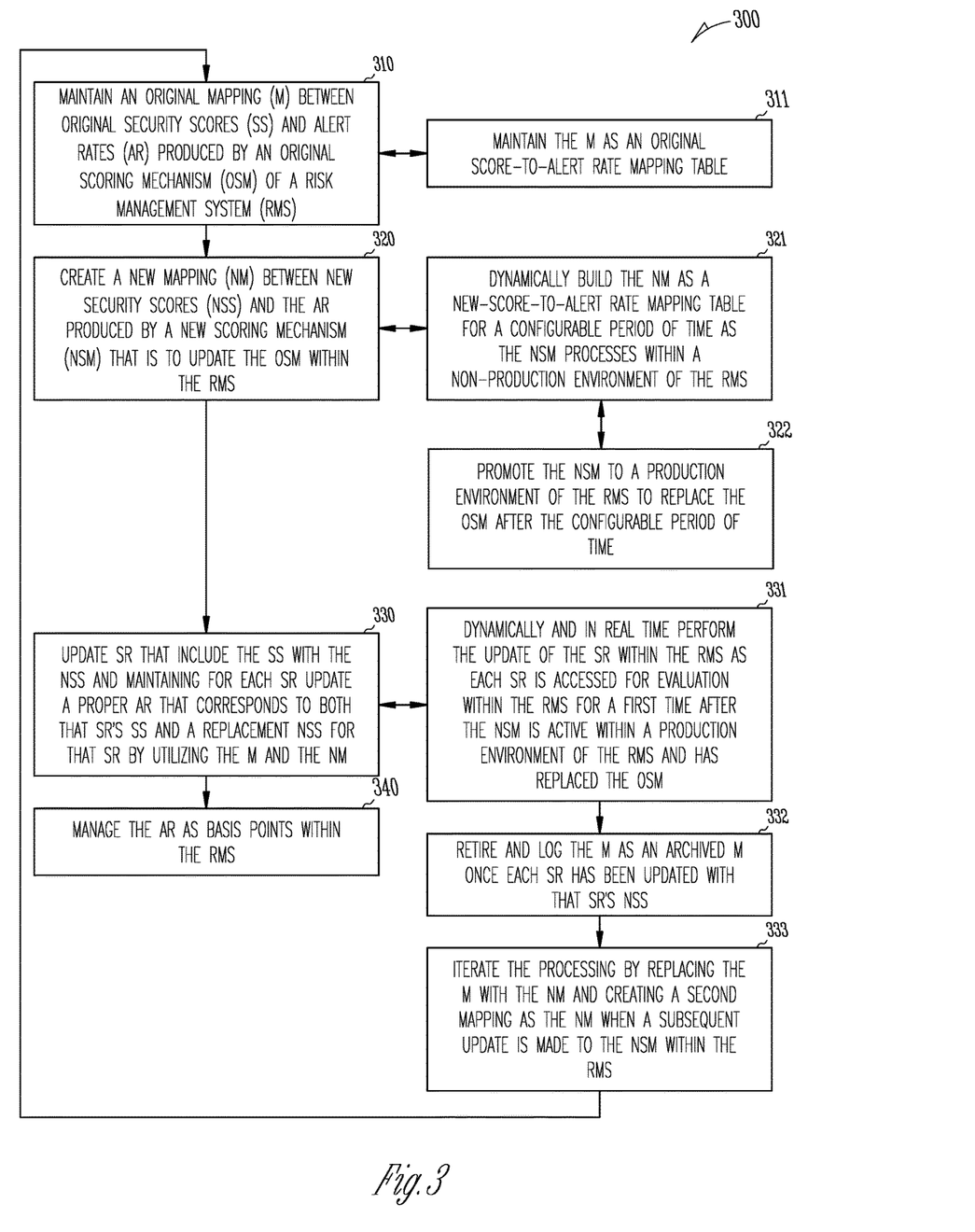
FIG. 3 is a diagram of another method for providing security system monitoring, according to an example embodiment.

FIG. 3 is a diagram of another method 300 for providing security system monitoring, according to an example embodiment. The software module(s) that implements the method 300 is referred to as a "risk management score mapper." The risk management score mapper is implemented as executable instructions programmed and residing within memory and/or a non-transitory computer-readable (processor-readable) storage medium and executed by one or more processors of a device. The processors that execute the risk management score mapper are specifically configured and programmed to process the risk management score mapper. The risk management score mapper has access to one or more network connections during its processing. The network connections can be wired, wireless, or a combination of wired and wireless.

In an embodiment, the device that executes risk management score mapper is a server.

In an embodiment, the risk management score mapper executes within a processing context of the risk management system 131 of the FIG. 1A.

In an embodiment, risk management score mapper is the score mapper 135 of the FIG. 1A.

In an embodiment, the risk management score mapper is the score mapping manager described with respect to the FIG. 2.

At 310, the risk management score mapper maintains an original mapping between original security scores and alert rates produced by an original scoring mechanism of a risk management system.

In an embodiment, at 311, the risk management score mapper maintains the original mapping as an original score-to-alert rate mapping table having the distribution of the original scoring mechanisms range of scores and the corresponding alert rates for each score within the range of scores.

At 320, the risk management score mapper creates a new mapping between new security scores and the alert rates produced by a new scoring mechanism that is to update the original scoring mechanism within the risk management system.

According to an embodiment, at 321, the risk management score mapper dynamically builds the new mapping as a new-score-to-alert rate mapping for a configurable period of time as the new scoring mechanism processes within a non-production environment of the risk management system. This ensures that the new mapping is properly established with scores and their corresponding alert rates before the new scoring mechanism is promoted to a live production environment.

In an embodiment of 321 and at 322, the risk management score mapper promotes the new scoring mechanism to a production environment of the risk management system to replace the original scoring mechanism after the configurable period of time.

At 330, the risk management score mapper updates the security rules that include the original security scores with the new security scores while maintaining for each security rule update a proper alert rate that corresponds to both that security rule's original security score and a replacement new security score for that security rule by utilizing the original mapping and the new mapping.

In an embodiment, at 331, the risk management score mapper, dynamically and in real time, performs the update of the security rules within the risk management system as each security rule is accessed for evaluation within the risk management system for a first time after the new scoring mechanism is active within a production environment of the risk management system and has replaced the original scoring mechanism.

In an embodiment of 331 and at 332, the risk management score mapper retires and logs the original mapping and an archived mapping once each security rule has been updated with that security rule's new security score.

In an embodiment of 332 and at 333, the risk management score mapper iterates the processing 310-330 by replacing the original mapping with the new mapping and creating a second mapping as the new mapping when a subsequent update is made to the new scoring mechanism within the risk management system. So, in this way, the risk management score mapper is self-sustaining and automated each time the risk management's scoring mechanism is changed.

According to an embodiment, at 340, the risk management score mapper manages the alert rates as basis points. This was discussed above with reference to the FIGS. 1A-1C.

Figure 4:
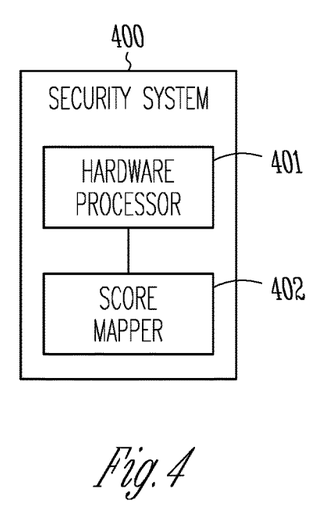
FIG. 4 is a diagram of a security system monitoring system, according to an example embodiment.

FIG. 4 is a diagram of a security system monitoring system 400, according to an example embodiment. The security system monitoring system 400 includes a variety of hardware components and software components. The software components of the security system monitoring system 400 are programmed and reside within memory and/or a non-transitory computer-readable medium and execute on one or more processors of the security system monitoring system 400. The security system monitoring system 400 communicates over one or more networks, which can be wired, wireless, or a combination of wired and wireless.

In an embodiment, the security system monitoring system 400 is configured to provide, inter alia, the processing described above with respect to the score mapper 135 of the FIG. 1A.

In an embodiment, the security system monitoring system 400 is configured to provide, inter alia, the processing described above with respect to the FIG. 2.

In an embodiment, the security system monitoring system 400 is configured to provide, inter alia, the processing described above with respect to the FIG. 3.

In an embodiment, the In an embodiment, the security system monitoring system 400 is configured to provide, inter alia, the processing described above with respect to all or some combination of the FIGS. 1A, 2, and 3.

The security system monitoring system 400 includes a hardware processor 401 and a score mapper 402.

The hardware processor 401 is specifically configured as a special purpose processor to execute instructions representing the score mapper 402 from memory and/or a non-transitory computer-readable storage medium.

In an embodiment, the hardware processor 401 is part of a hardware server.

The score mapper 402 is adapted and configured to: execute on the hardware processor 401, maintain a linkage between original security scores embedded in security rules of a security system and alert rates, and iii) update the security rules with new security scores when a scoring mechanism of the security system is updated by maintaining a same alert rate for each updated security rule that existed prior to update.

In an embodiment, the security system is a risk management system. In an embodiment of the latter embodiment, the risk management system is part of a core banking system of a financial institution. In an embodiment, the risk management system is the risk management system 131 of the FIG. 1A. In an embodiment, the core banking system is the core banking system 130 of the FIG. 1A.

In an embodiment, the security system is any network-based security system that includes a scoring mechanism and rules that rely on scores produced by the scoring mechanism to raise alerts.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving, by executable instructions that execute on a hardware processor of a server from a non-transitory computer-readable storage medium over a network, a security score along with an alert rate for the security score, wherein receiving further includes identifying a particular security rule that relies on the security score and identifying an original scoring mechanism relied on by the particular security rule, wherein the alert rate is calculated as a total number of particular alerts generated for the particular security rule divided by a total number of transactions occurring over the network;

identifying, by the executable instructions, a new security score by matching the alert rate with the new security score;

mapping, by the executable instructions, the security score to the new security score in the original scoring mechanism;

triggering, by the executable instructions, over the network, a processing of an automated security action in response to the new security score;

processing, a transaction rule directed to a financial transaction with transaction information for the financial transaction and the new security rule as the automated security action; and declining the financial transaction when the transaction rule evaluates to true.

2. The method of claim 1, wherein receiving further includes receiving the security score from the particular security rule that is being evaluated in a security system over the network, wherein the security score produced by the original scoring mechanism.

3. The method of claim 1, wherein identifying further includes obtaining the new security score by searching a mapping table having the alert rate and other alert rates produced by an updated scoring mechanism that is replacing the original scoring mechanism, wherein an original scoring mechanism produced the security score.

4. The method of claim 1, wherein mapping further includes updating an original security rule that utilizes the security score as a condition within the original security rule with the new security score.

5. The method of claim 1 further comprising, maintaining, by the executable instructions, an original score mapping table that includes entries for the security score and other security scores produced by the original scoring mechanism of a security system, each entry includes a unique security score and particular alert rate combination.

6. The method of claim 5 further comprising, maintaining, by the executable instructions, a new score mapping table that includes new entries for the new security score and other new security scores produced by an updated version of the original scoring mechanism, each new entry includes a unique new security score and a particular alert rate combination.

7. The method of claim 6 further comprising, creating, by the executable instructions, a mapping transition table that includes mapping entries, each mapping entry including: a unique security score, a unique new security score, and a particular alert rate.

8. The method of claim 7 further comprising, processing, in real time within a context of a security system, by the executable instructions, the original score mapping table, the new score mapping table, and the mapping transition table to update security rules of the security system by replacing the security scores identified in the security rules with the new security scores.

9. The method of claim 8, further comprising, logging, by the executable instructions, the original score mapping table, the new score mapping table, and the mapping transition table when each of the security rules have been successfully updated within the security system.

10. A method, comprising:
maintaining, by executable instructions that execute on a hardware processor from a non-transitory computer-readable medium over a network, an original mapping between original security scores and alert rates produced by an original scoring mechanism of a risk management system, wherein each alert rate calculated as a total number of particular alerts generated for a particular security rule divided by a total number of transactions occurring over the network, wherein the particular security rule relies on a particular original score and the original scoring mechanism;

creating, by the executable instructions, a new mapping between new security scores and the alert rates produced by a new scoring mechanism that is to update the original scoring mechanism within the risk management system;

updating, by the executable instructions, security rules that include the original security scores with the new security scores and maintaining for each security rule update a proper alert rate that corresponds to both that security rule's original security score and a replacement new security score for that security rule by utilizing the original mapping and the new mapping;

automatically triggering, by the executable instructions, over the network, a processing of a security action in response to evaluation of the updated security rules having the new security scores;

processing, a transaction rule directed to a financial transaction with transaction information for the financial transaction and a particular one of the new security rules as the automated security action; and declining the financial transaction when the transaction rule evaluates to true.

11. The method of claim 10, wherein maintaining further includes maintaining the original mapping as an original score-to-alert rate mapping table.

12. The method of claim 10, wherein creating further includes dynamically building the new mapping as a new-score-to-alert rate mapping table for a configurable period of time as the new scoring mechanism processes within a non-production environment of the risk management system.

13. The method of claim 12, wherein dynamically building further includes promoting the new scoring mechanism to a production environment of the risk management system to replace the original scoring mechanism after the configurable period of time.

14. The method of claim 10, wherein updating further includes dynamically and in real time performing the updating of the security rules within the risk management system as each security rule is accessed for evaluation within the risk management system for a first time after the new scoring mechanism is active within a production environment of the risk management system and has replaced the original scoring mechanism.

15. The method of claim 14 further comprising, retiring and logging, by the executable instructions, the original mapping as an archived original mapping once each security rule has been updated with that security rule's new security score.

16. The method of claim 15 further comprising, iterating processing of the method, by the executable instructions, by replacing the original mapping with the new mapping and creating a second mapping as the new mapping when a subsequent update is made to the new scoring mechanism within the risk management system.

17. The method of claim 10 further comprising, managing, by the executable instructions, the alert rates as basis points within the risk management system.

18. A system, comprising:

a processor configured to execute instructions representing a score mapper from memory or a non-transitory computer-readable storage medium, wherein the processor is part of a server accessible over a network; and the score mapper configured and adapted to: i) execute on the processor, ii) maintain a linkage between original security scores embedded in security rules of a security system and alert rates, wherein each alert rate calculated as a total number of particular alerts generated for a particular security rule divided by a total number of transactions, wherein the particular secure rule relies on a particular security score associated with a scoring mechanism of the security system, iii) update the security rules with new security scores when the scoring mechanism of the security system is updated by maintaining a same alert rate for each updated security rule that existed prior to update; iv) trigger over the network an automatic processing of a security action in response to evaluation of the updated security rules with the new security scores, v) process a transaction rule directed to a financial transaction with transaction information for the financial transaction and a particular one of the new security rules as the automated security action; and vi) decline the financial transaction when the transaction rule evaluates to true.

19. The system of claim 18, wherein the security system is a risk management system.

20. The system of claim 19, wherein the risk management system is part of a core banking system of a financial institution.

* * * * *